United States Patent
Mirza et al.

(10) Patent No.: US 12,413,434 B1
(45) Date of Patent: Sep. 9, 2025

(54) SERVICE AWARE PROXY-CALL SESSION CONTROL FUNCTION (P-CSCF) TRAFFIC ROUTING

(71) Applicant: T-Mobile USA, Inc., Bellevue, WA (US)

(72) Inventors: Khurram Ahmad Mirza, Bellevue, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 699 days.

(21) Appl. No.: 17/221,761

(22) Filed: Apr. 2, 2021

(51) Int. Cl.
  *H04L 47/12* (2022.01)
  *H04L 12/14* (2006.01)
  *H04L 65/1016* (2022.01)
  *H04L 65/1045* (2022.01)

(52) U.S. Cl.
  CPC .......... *H04L 12/1407* (2013.01); *H04L 47/12* (2013.01); *H04L 65/1016* (2013.01); *H04L 65/1045* (2022.05)

(58) Field of Classification Search
  CPC . H04L 12/1407; H04L 65/1045; H04L 47/12; H04L 65/1016
  See application file for complete search history.

(56) References Cited

U.S. PATENT DOCUMENTS

| | | | |
|---|---|---|---|
| 9,332,041 B2 * | 5/2016 | Bakker | ............... H04L 65/1096 |
| 9,516,577 B2 | 12/2016 | Punz | |
| 9,560,082 B2 | 1/2017 | Rasanen | |
| 10,154,371 B1 * | 12/2018 | Rahat | ...................... H04W 4/02 |
| 10,284,420 B2 | 5/2019 | Livanos et al. | |
| 10,326,804 B1 * | 6/2019 | Agarwal | ............. H04L 65/1069 |
| 10,491,753 B2 | 11/2019 | Al-Mehdar et al. | |
| 10,764,376 B2 | 9/2020 | Stammers | |
| 10,917,527 B2 | 2/2021 | Ahmadi | |
| 2006/0090001 A1 * | 4/2006 | Collins | ............... H04L 65/1101 709/230 |
| 2008/0256251 A1 * | 10/2008 | Huotari | ............... H04L 67/1001 709/229 |

(Continued)

OTHER PUBLICATIONS

Non-Final Office Action mailed on Feb. 2, 2022, in U.S. Appl. No. 17/232,073, 11 pages.

(Continued)

*Primary Examiner* — Syed Ali
(74) *Attorney, Agent, or Firm* — Foley IP Law, PLLC

(57) ABSTRACT

Solutions for service aware proxy-call session control function (P-CSCF) traffic routing include: receiving, at a master P-CSCF in a pool of a plurality of P-CSCFs, internet protocol (IP) multimedia subsystem (IMS) traffic from a device; determining, by the master P-CSCF, a traffic type (e.g., 5G, 4G, SMS, WiFi, etc.) of the IMS traffic from the device; based on at least the traffic type of the IMS traffic from the device, selecting, by the master P-CSCF, a serving P-CSCF from the pool for the device; and forwarding, by the serving P-CSCF for the device, the IMS traffic from the device to an IMS. In some examples, the serving P-CSCF selection also includes loading considerations. In some examples, an alternate P-CSCF is available for failover as the new master P-CSCF. In some examples, a network includes multiple pools of P-CSCFs, with each pool having its own master P-CSCF and alternate P-CSCF.

13 Claims, 6 Drawing Sheets

(56) References Cited

U.S. PATENT DOCUMENTS

| | | | |
|---|---|---|---|
| 2009/0116467 A1* | 5/2009 | Shi | H04L 67/30 370/338 |
| 2009/0144429 A1* | 6/2009 | Astrom | H04L 65/40 709/227 |
| 2010/0299451 A1 | 11/2010 | Yigang et al. | |
| 2011/0075655 A1* | 3/2011 | Sahin | H04L 65/1045 370/352 |
| 2011/0076982 A1* | 3/2011 | Li | H04L 65/1016 370/352 |
| 2011/0165901 A1 | 7/2011 | Baniel et al. | |
| 2011/0200013 A1* | 8/2011 | Cheng | H04W 36/0011 370/331 |
| 2012/0069840 A1* | 3/2012 | Zhu | H04L 65/104 370/353 |
| 2014/0086177 A1* | 3/2014 | Adjakple | H04W 74/04 370/329 |
| 2015/0326619 A1* | 11/2015 | Lau | H04L 65/1073 370/328 |
| 2015/0350983 A1* | 12/2015 | Kwok | H04W 36/247 370/331 |
| 2015/0358853 A1* | 12/2015 | Kiss | H04W 28/0263 370/230 |
| 2016/0057607 A1* | 2/2016 | Dubesset | H04W 8/04 455/433 |
| 2016/0156678 A1* | 6/2016 | Li | H04L 12/1407 370/352 |
| 2016/0255490 A1 | 9/2016 | Mufti et al. | |
| 2016/0344817 A1 | 11/2016 | Renzullo et al. | |
| 2017/0111915 A1* | 4/2017 | Mathias | H04W 4/12 |
| 2018/0007612 A1* | 1/2018 | Jahangir | H04L 61/503 |
| 2018/0103500 A1* | 4/2018 | Chiang | H04L 65/1073 |
| 2018/0262924 A1* | 9/2018 | Dao | H04W 72/535 |
| 2019/0037451 A1* | 1/2019 | Chaponniere | H04W 76/38 |
| 2019/0059024 A1* | 2/2019 | Mufti | H04L 65/1069 |
| 2019/0075139 A1* | 3/2019 | Bouvet | H04L 67/1014 |
| 2019/0215729 A1* | 7/2019 | Oyman | H04L 65/1016 |
| 2020/0413337 A1* | 12/2020 | Liu | G06F 21/81 |
| 2021/0044628 A1* | 2/2021 | Foti | H04L 67/52 |
| 2021/0176817 A1* | 6/2021 | Takakura | H04L 65/1069 |
| 2022/0131908 A1* | 4/2022 | Oyman | H04L 65/752 |
| 2022/0131911 A1* | 4/2022 | Das | H04L 65/1016 |
| 2022/0201639 A1* | 6/2022 | Abtin | H04L 65/1104 |
| 2022/0232376 A1 | 7/2022 | Dauneria et al. | |

OTHER PUBLICATIONS

Final Office Action mailed on Aug. 4, 2022, in U.S. Appl. No. 17/232,073, 12 pages.

Non-Final Office Action mailed on Dec. 5, 2022, in U.S. Appl. No. 17/232,073, 11 pages.

Notice of Allowance mailed on Apr. 4, 2022, in U.S. Appl. No. 17/233,248, 8 pages.

* cited by examiner

SERVICE AWARE PROXY-CALL SESSION CONTROL FUNCTION (P-CSCF) TRAFFIC ROUTING

BACKGROUND

A proxy-call session control function (P-CSCF) is a session initiation protocol (SIP) proxy that is the first point of contact for a user equipment (UE) in a mobile network. SIP traffic to and from a UE passes through a P-CSCF and an internet protocol (IP) multimedia subsystem (IMS). For example, in order to make a voice or video call, a UE sends a SIP message (e.g., a SIP invite) to a P-CSCF, which forwards it to the IMS, in order to reach the called party. Different types of IMS traffic, such as fifth generation (5G) cellular, fourth generation (4G) cellular, short message service (SMS), WiFi, in-vehicle local area network (LAN), and rich communication services (RCS), currently exist and must be supported by all P-CSCFs. When a P-CSCF ceases operation (e.g., due to being overloaded, maintenance, or some other reason) large numbers of users (e.g., humans with a UE, internet of things (IoT) devices, or others) lose service.

SUMMARY

The following summary is provided to illustrate examples disclosed herein, but is not meant to limit all examples to any particular configuration or sequence of operations.

Solutions for service aware proxy-call session control function (P-CSCF) traffic routing include: receiving, at a master P-CSCF in a pool of a plurality of P-CSCFs, internet protocol (IP) multimedia subsystem (IMS) traffic from a device; determining, by the master P-CSCF, a traffic type (e.g., 5G, 4G, SMS, WiFi, etc.) of the IMS traffic from the device; based on at least the traffic type of the IMS traffic from the device, selecting, by the master P-CSCF, a serving P-CSCF from the pool for the device; and forwarding, by the serving P-CSCF for the device, the IMS traffic from the device to an IMS. In some examples, the serving P-CSCF selection also includes loading considerations. In some examples, an alternate P-CSCF is available for failover as the new master P-CSCF. In some examples, a network includes multiple pools of P-CSCFs, with each pool having its own master P-CSCF and alternate P-CSCF. In some examples, the traffic type may be: fifth generation (5G) cellular, fourth generation (4G) cellular, short message service (SMS), WiFi, in-vehicle local area network (LAN), rich communication services (RCS), or another cellular generation.

BRIEF DESCRIPTION OF THE DRAWINGS

The disclosed examples are described below with reference to the accompanying drawing figures listed below, wherein.

Figure 1:
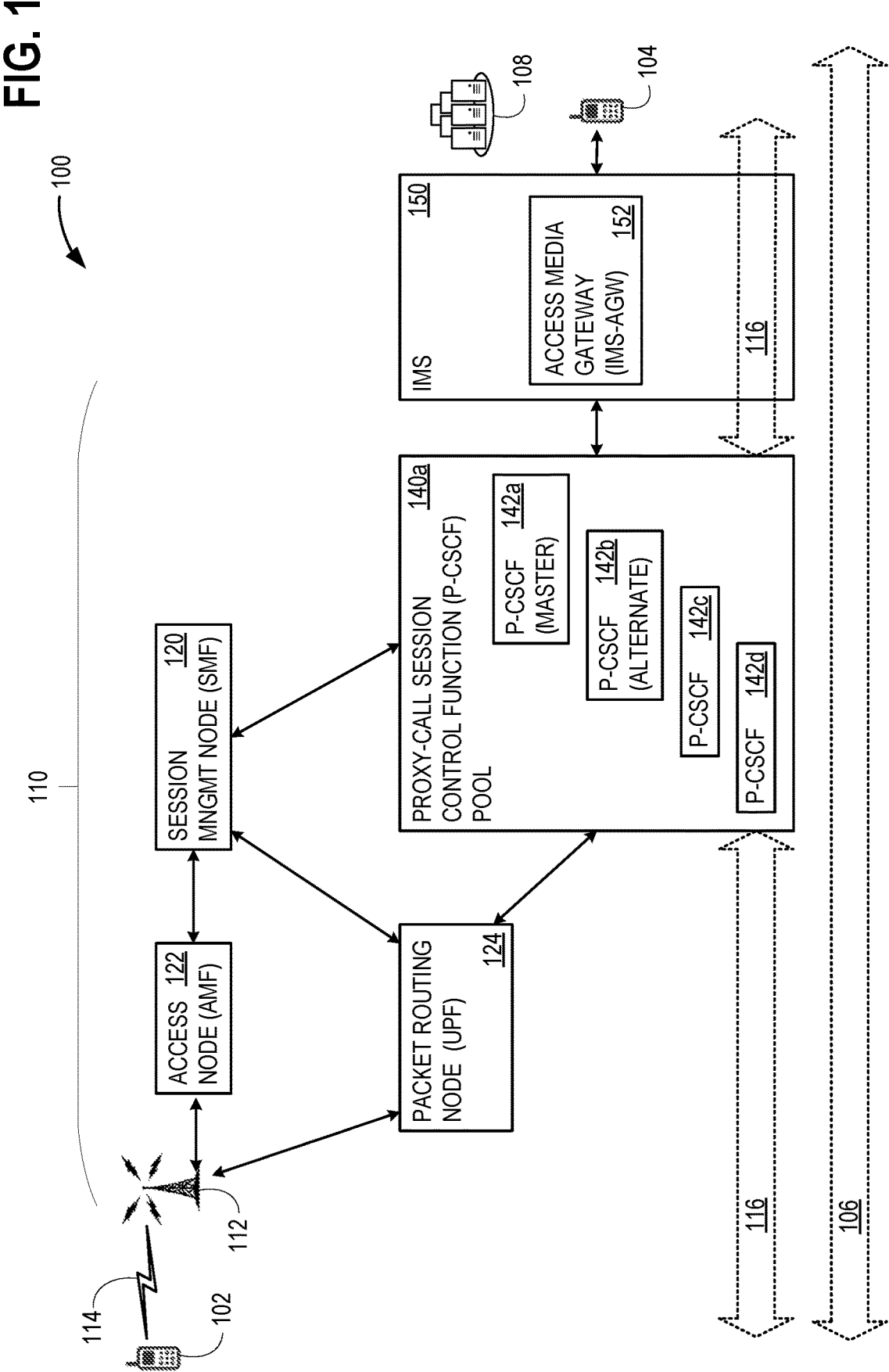
FIG. 1 illustrates an exemplary arrangement that advantageously enables service aware proxy-call session control function (P-CSCF) traffic routing.

Corresponding reference characters indicate corresponding parts throughout the drawings. References made throughout this disclosure relating to specific examples, are provided for illustrative purposes, and are not meant to limit all implementations or to be interpreted as excluding the existence of additional implementations that also incorporate the recited features.

DETAILED DESCRIPTION

Solutions for service aware proxy-call session control function (P-CSCF) traffic routing include: receiving, at a master P-CSCF in a pool of a plurality of P-CSCFs, internet protocol (IP) multimedia subsystem (IMS) traffic from a device (e.g., a user equipment (UE) or another device); determining, by the master P-CSCF, a traffic type of the IMS traffic from the device; based on at least the traffic type of the IMS traffic from the device, selecting, by the master P-CSCF, a serving P-CSCF from the pool for the device; and forwarding, by the serving P-CSCF for the device, the IMS traffic from the device to an IMS. In some examples, the serving P-CSCF selection also includes loading considerations. In some examples, an alternate P-CSCF is available for failover as the new master P-CSCF. In some examples, a network includes multiple pools of P-CSCFs, with each pool having its own master P-CSCF and alternate P-CSCF. In some examples, the traffic type may be: fifth generation (5G) cellular, fourth generation (4G) cellular, short message service (SMS), WiFi, in-vehicle local area network (LAN) such as in-flight wireless, rich communication services (RCS), or another cellular generation such as third generation (3G) or (when it arrives) sixth generation (6G).

Aspects of the disclosure simplify and improve the operation of computer networks by permitting consolidation of traffic type on different P-CSCFs (e.g., providing a network slicing functionality), thereby relaxing the requirement that every P-CSCF support every type of traffic. Not only may this reduce the cost of provisioning P-CSCFs, but also, in some scenarios, a P-CSCF may exhibit superior performance by handling only limited traffic types. These advantages are enabled by a master P-CSCF selecting a serving P-CSCF for a device, based on at least the traffic type of the IMS traffic from the device. The master P-CSCF serves as a traffic sorter and load balancer for PCSCFs in a pool (e.g., a region). The master P-CSCF distributes traffic to other P-CSCFs on the basis of their services and provides load balancing properties, fault/outage detection, distributed denial of service (DDOS) response, network robustness and resilience.

For example, a common core network may have six to ten pools of approximately a dozen or more P-CSCFs each. In a pool, two may cater to 5G traffic; four may cater to 4G traffic; one each may cater to SMS, RCS traffic, or in-flight wireless, or serve integration access; and two may handle any traffic type, as necessary. Two P-CSCFs will perform additional duties, one as the master P-CSCF, to act as an initial traffic entry point and steer traffic to one of the P-CSCFs in the pool (based on type and/or for load balancing), and one as an alternate master. As traffic types change (e.g., users migrating from 4G to 5G, the balance of P-CSCFs dedicated to 5G and 4G traffic may change. As 6G is rolled out, further significant advantageous savings may be realized by reducing the number of P-CSCFs (if 6G uses P-CSCFs) that must be compatible with 6G, immediately upon 6G availability.

FIG. 1 illustrates an exemplary arrangement 100 that advantageously enables service aware P-CSCF traffic routing, for example when establishing a data traffic session 106 for a device 102 on a network 110. Data traffic sessions include voice and video calls between UEs and streaming video. In some examples, device 102 comprises a UE, and data traffic session 106 comprises a voice or video call with another UE 104. In some examples, device 102 streams video over data traffic session 106 from a remote resource 108. In some examples, device 102 comprises an internet of things (IoT) device, such as a connected appliance, a smart home security system, an autonomous factory or farming machine, a wearable health monitor, a wireless inventory tracker, or another device, which uploads or downloads data from remote resource 108 using data traffic session 106. Device 102 sets up data traffic session 106 using session initiation protocol (SIP) signaling 116, such as a SIP invite. SIP signaling 116 and data traffic session 106 are each IMS traffic, because they pass through IMS 150.

Data traffic session 106 passes from device 102, over an air interface 114, through a radio access network (RAN) 112, a packet routing node 124, a selected one of a plurality of P-CSCFs 142a-142d (in a P-CSCF pool 140a), and an IMS Access Media Gateway (IMS-AGW) 152 in an IMS 150. P-CSCF pool 140a comprises a pool of a plurality of P-CSCFs. Although only a single packet routing node 124 is shown, it should be understood that network 110 may have multiple packet routing nodes. In some examples, device 102 is assigned to packet routing node 124 via a session management node 120, and device 102 communicates with session management node 120 via an access node 122.

Figure 2:
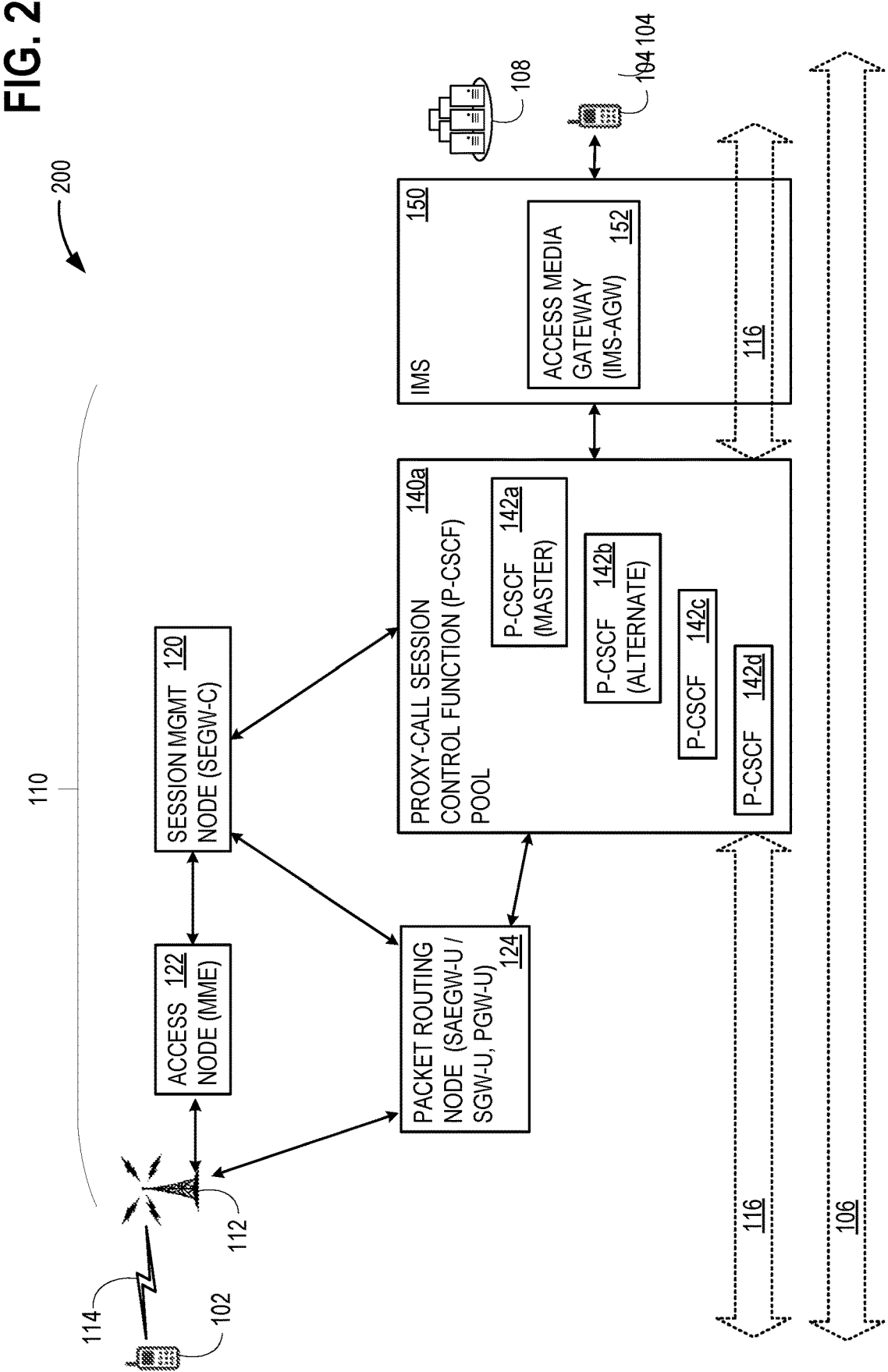
FIG. 2 illustrates an alternative configuration that also advantageously enables service aware P-CSCF traffic routing.

Arrangement 100 is shown as 5G cellular, in which packet routing node 124 comprises a user plane function (UPF), session management node 120 comprises a session management function (SMF), and access node 122 comprises an access and mobility management function (AMF). FIG. 2 illustrates an alternative 4G cellular configuration 200, in which access node 122 comprises a mobility management entity (MME), session management node 120 comprises a system architecture (SAE) evolution gateway—control plane (SAEGW-C), and packet routing node 124 comprises an SAE evolution gateway—user plane (SAEGW-U). An SAEGW-C is the combination of a serving gateway (SGW)—control plane (SGW-C) and a packet data network gateway (PGW)—control plane (PGW-C). An SAEGW-U is the combination of an SGW—user plane (SGW-U) and a PGW—user plane (PGW-U). The functional aspects of arrangement 200 are similar to those of arrangement 100, with respect to the operation of P-CSCF pool 140a.

Figure 3:
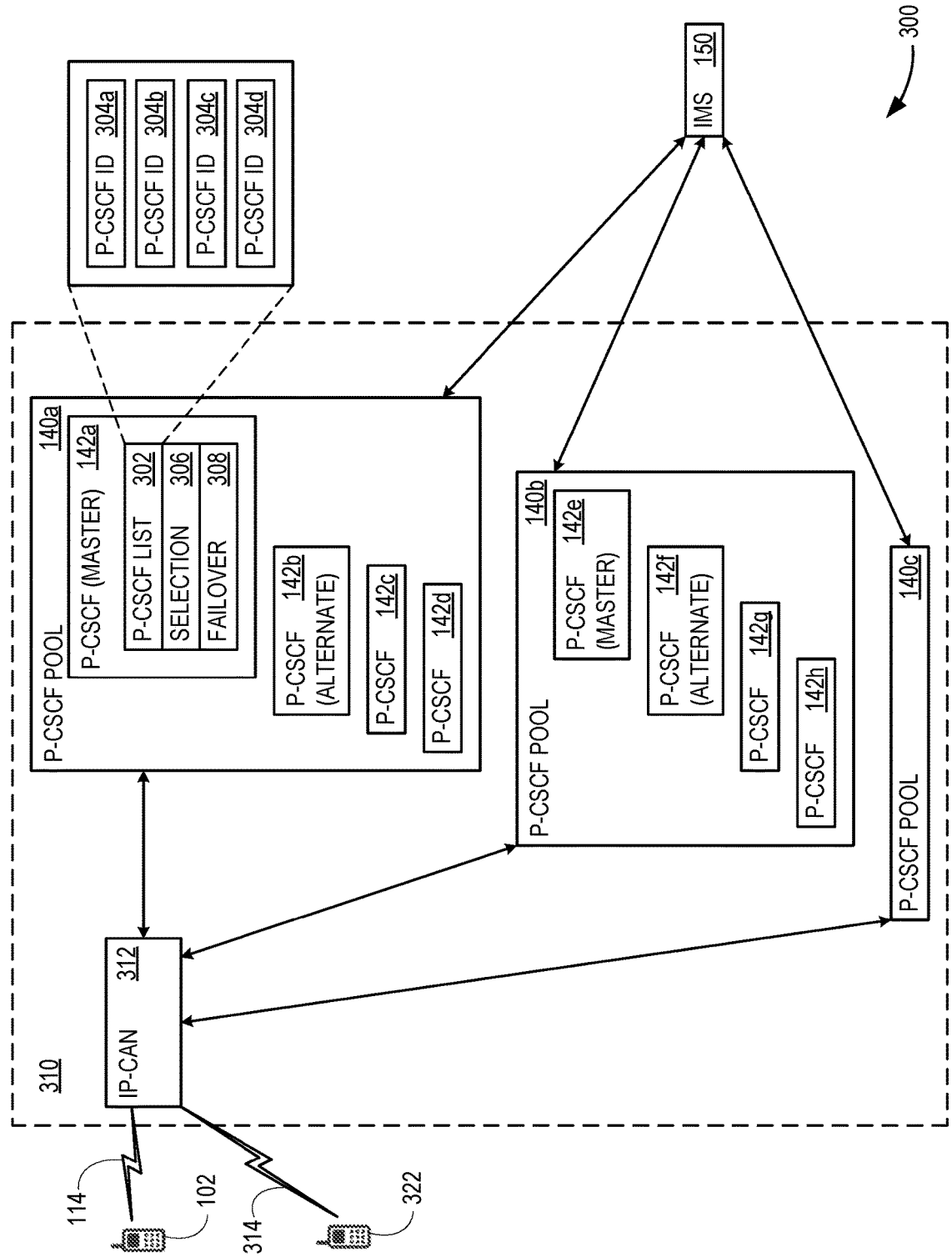
FIG. 3 illustrates a generic architecture that incorporates features of the arrangements of FIG. 1 and/or FIG. 2.

FIG. 3 illustrates an arrangement 300 that incorporates features of the arrangements of FIG. 1 and/or FIG. 2. The various 5G and/or 4G components of network 110 (of FIGS. 1 and 2) are represented as an IP connectivity access network (IP-CAN) 312 within a common core network 310. Thus, device 102 communicates with an IMS 150 via air interface 114, IP-CAN 312, and P-CSCF pool 140a. A second device 322 communicates with an IMS 150 via air interface 314, IP-CAN 312, and a P-CSCF pool 140b. As indicated, common core network 310 comprises a plurality of P-CSCF pools: P-CSCF pool 140a, P-CSCF pool 140b, and a P-CSCF pool 140c. In some examples, P-CSCF pools 140a-140c are defined, at least in part, by geographical regions (e.g. devices 102 and 322 use different P-CSCF pools because they are in different geographical regions). Each of P-CSCF pools 140a-140c comprises a plurality of P-CSCFs.

For example, as already indicates in FIGS. 1 and 2, P-CSCF pool 140a comprises P-CSCF 142a, P-CSCF 142b, P-CSCF 142c, and P-CSCF 142d. P-CSCF 142a performs as a master node for P-CSCF pool 140a, and P-CSCF 142b is an alternate master node in the event of a failover (e.g., if P-CSCF 142a is not functioning as a master node because it has ceased operation or has another problem). P-CSCF pool 140b is similarly structured, and comprises a P-CSCF 142e, a P-CSCF 142f, a P-CSCF 142g, and a P-CSCF 142h. P-CSCF 142e performs as a master node for P-CSCF pool 140b, and P-CSCF 142f is an alternate master node in the event of a failover (e.g., if P-CSCF 142e is not functioning as a master node because it has ceased operation or has another problem). P-CSCF pool 140c is also similarly configured.

P-CSCF 142a has a P-CSCF list 302 that identifies P-CSCFs within P-CSCF pool 140a, and their ability to handle IMS traffic, such as traffic loading and status (functioning or out of service). For example, P-CSCF identification (ID) 304a indicates loading and status for P-CSCF 142a, P-CSCF ID 304b indicates loading and status for P-CSCF 142b, P-CSCF ID 304c indicates loading and status for P-CSCF 142c, and P-CSCF ID 304d indicates loading and status for P-CSCF 142d. A selection logic 306 selects a serving P-CSCF (e.g., one of P-CSCFs 142a-142d) for device 102 based on at least the traffic type and using loading and status information in P-CSCF list 302.

P-CSCF 142a is also shown as including a failover control 308, although failover control 308 may be located within IP-CAN 312 (e.g., within session management node 120), within P-CSCF 142b, and/or within another node within P-CSCF pool 140a. In the event that P-CSCF 142a is unable to function properly as the master node for P-CSCF pool 140a, failover control 308 performs a failover to P-CSCF 142b so that P-CSCF 142b functions as the master node for P-CSCF pool 140a. P-CSCF 142e and the master P-CSCF for P-CSCF pool 140c are configured similarly P-CSCF 142a, and P-CSCF pools 140b and 140c have similar failover capability. The operations of arrangement 300 with respect to service aware P-CSCF traffic routing are described in relation to FIG. 4.

Figure 4:
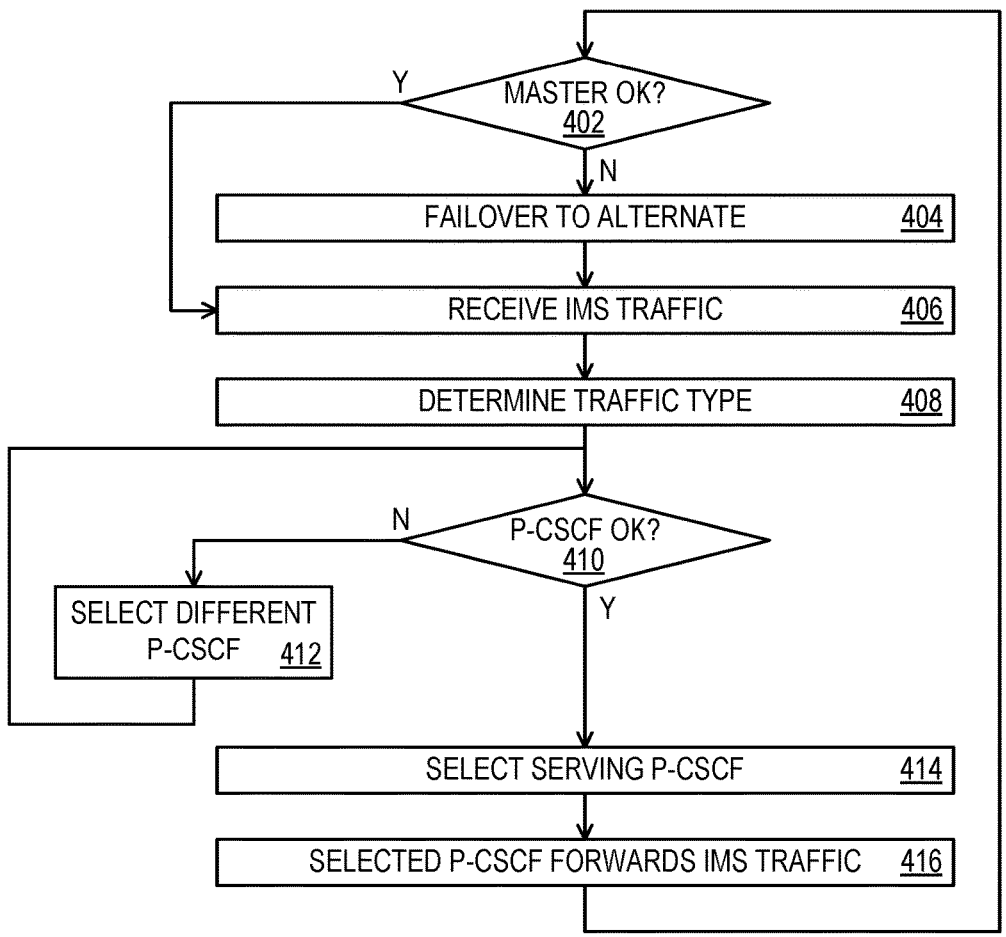
FIG. 4 illustrates a flowchart of exemplary operations that may be associated with examples of the arrangement of FIG. 3.

FIG. 4 illustrates a flowchart 400 of exemplary operations that may be associated with examples of arrangement 300 (and thus, by extension, also arrangements 100 and 200). That is, flowchart 400 identifies exemplary operations associated with service aware P-CSCF traffic routing. In some examples, at least a portion of flowchart 400 may each be performed using one or more computing devices 600 of FIG. 6. A decision operation 402 determines whether (initially-designated) master P-CSCF 142a in P-CSCF pool 140a (e.g., a pool of a plurality of P-CSCFs) is functioning as a master node for P-CSCF pool 140a. If it is not, then operation 404 includes, based on at least determining that P-CSCF 142a is not functioning as the master node for P-CSCF pool 140a, performing a failover to P-CSCF 142b (the alternate master P-CSCF) in P-CSCF pool 140a. For the remainder of flowchart 400 (until P-CSCF 142a is restored as the master node, alternate master P-CSCF 142b functions as the master node for P-CSCF pool 140a.

Operation 406 includes receiving, at P-CSCF 142a (if P-CSCF 142a is performing as the master P-CSCF, or P-CSCF 142b, if P-CSCF 142b is performing as the master P-CSCF), IMS traffic from device 102. In some examples, device 102 comprises a cellular UE mobile device or an IoT device. In some examples, the IMS traffic comprises a session SIP invite. Operation 408 includes determining, by master P-CSCF 142a, a traffic type of the IMS traffic from device 102. In some examples, the traffic type is selected from a list consisting of: 5G cellular, 4G cellular, SMS, WiFi, in-vehicle LAN (e.g., in-flight WiFi), RCS, and another cellular generation.

Decision operation 410 includes determining, by master P-CSCF 142a, whether a P-CSCF that is a candidate for being the serving P-CSCF for device 102 is able to handle traffic for device 102. In some examples, determining whether a P-CSCF is able to handle traffic for a device includes both determining whether the P-CSCF is properly functioning (e.g., is not down), and also determining whether the P-CSCF is overloaded (e.g., determining load balancing of a particular P-CSCF relative to other available P-CSCFs). If a P-CSCF is overloaded or down, it is not selected as the serving P-CSCF, for example by identifying it as not suitable at 412, so that another P-CSCF will instead be considered for selection in decision operation 410.

When a suitable P-CSCF is located, operation 414 includes, based on at least the traffic type of the IMS traffic from device 102, selecting, by master P-CSCF 142a, a serving P-CSCF for device 102. In some example, load balancing is also a selection criteria, and selecting the serving P-CSCF for device 102 comprises: selecting the serving P-CSCF for device 102 based on at least the traffic type of the IMS traffic from device 102 and based on at least determining that the serving P-CSCF for device 102 is able to handle traffic for device 102. For example, master P-CSCF 142a may select itself or P-CSCF 142c. However, if P-CSCF 142a may select itself or P-CSCF 142c are heavily loaded, and P-CSCF 142a handles a different traffic type (e.g., 4G versus 5G), P-CSCF 142a may instead select P-CSCF 142d.

Operation 416 includes forwarding, by the serving P-CSCF for device 102, the IMS traffic from device 102 to IMS 150. In some examples, IMS 150 comprises IMS-AGW 152. Flowchart 400 returns to decision operation 402 to determine whether a master node failover is needed.

Additional implementations of flowchart 400 operating in parallel for P-CSCF pools 140b and 140c. In a parallel version of flowchart 400 for P-CSCF pool 140b, for example, operation 406 includes receiving, at P-CSCF 142e (a second master P-CSCF) in P-CSCF pool 140b (a second pool of a plurality of P-CSCFs), IMS traffic from device 322, wherein P-CSCF pool 140a and P-CSCFs pool 140b reside within common core network 310. Operation 408 in the parallel flowchart 400 includes determining, by P-CSCF 142e, a traffic type of the IMS traffic from device 322. Operation 414 in the parallel flowchart 400 includes, based on at least the traffic type of the IMS traffic from device 322, selecting, by P-CSCF 142e, a serving P-CSCF for device 322. Operation 416 in the parallel flowchart 400 includes forwarding, by the serving P-CSCF for device 322, the IMS traffic from device 322 to IMS 150.

Figure 5:
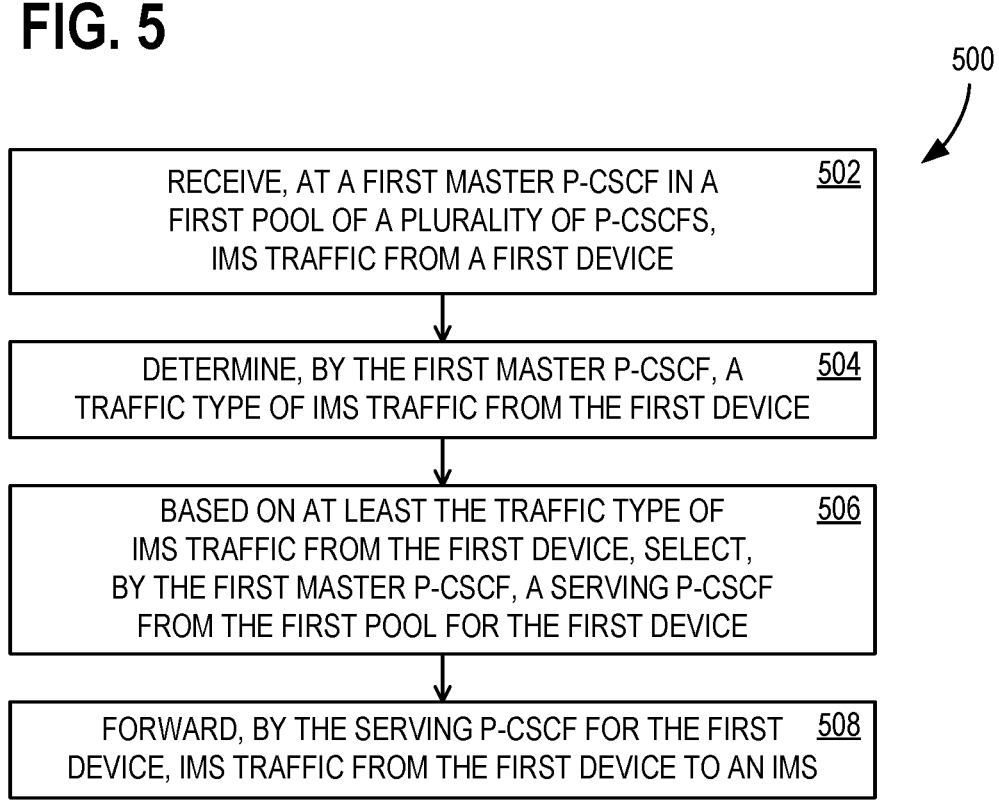
FIG. 5 illustrates another flowchart of exemplary operations that may be associated with examples of the arrangement of FIG. 3.

FIG. 5 illustrates a flowchart 500 of exemplary operations associated with service aware P-CSCF traffic routing. In some examples, at least a portion of flowchart 500 may be performed using one or more computing devices 600 of FIG. 6. Operation 502 includes receiving, at a first master P-CSCF in a first pool of a plurality of P-CSCFs, IMS traffic from a first device. Operation 504 includes determining, by the first master P-CSCF, a traffic type of the IMS traffic from the first device. Operation 506 includes based on at least the traffic type of the IMS traffic from the first device, selecting, by the first master P-CSCF, a serving P-CSCF from the first pool for the first device. Operation 508 includes forwarding, by the serving P-CSCF for the first device, the IMS traffic from the first device to an IMS.

Figure 6:
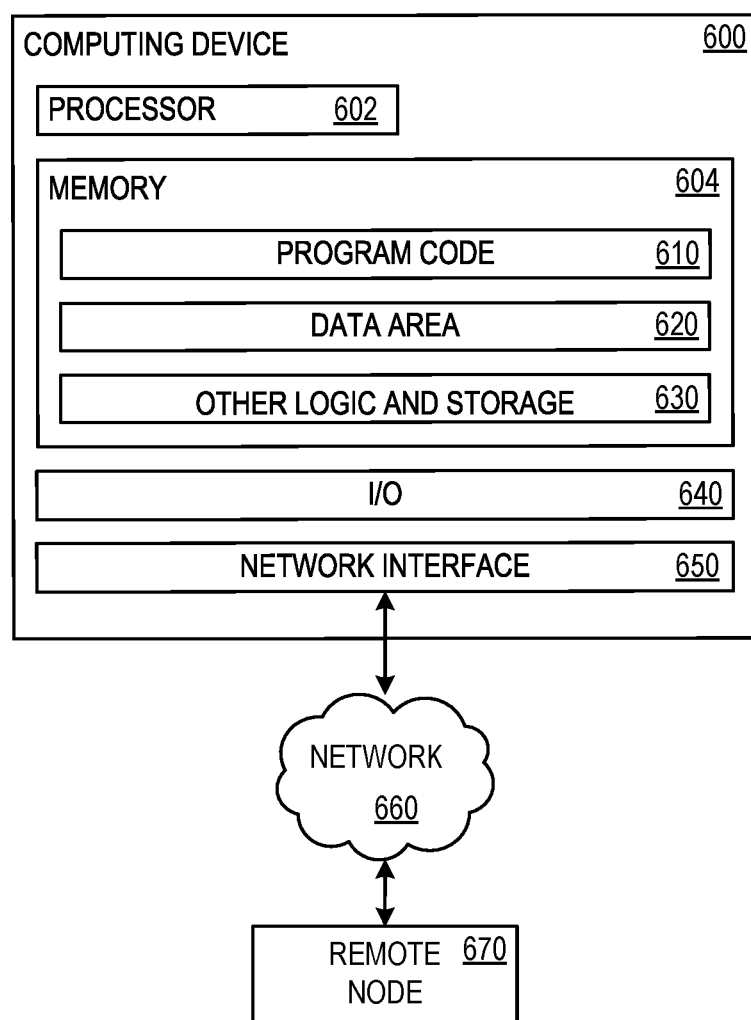
FIG. 6 illustrates a block diagram of a computing device suitable for implementing various aspects of the disclosure.

FIG. 6 illustrates a block diagram of computing device 600 that may be used as a component of arrangement 100, for example, as any component described herein that may require computational or storage capacity. Computing device 600 has at least a processor 602 and a memory 604 that holds program code 610, data area 620, and other logic and storage 630. Memory 604 is any device allowing information, such as computer executable instructions and/or other data, to be stored and retrieved. For example, memory 604 may include one or more random access memory (RAM) modules, flash memory modules, hard disks, solid-state disks, persistent memory devices, and/or optical disks. Program code 610 comprises computer executable instructions and computer executable components including any instructions necessary to perform operations described herein. Data area 620 holds any data necessary to perform operations described herein. Memory 604 also includes other logic and storage 630 that performs or facilitates other functions disclosed herein or otherwise required of computing device 600. An input/output (I/O) component 640 facilitates receiving input from users and other devices and generating displays for users and outputs for other devices. A network interface 650 permits communication over a network 660 with a remote node 670, which may represent another implementation of computing device 600.

Additional Examples

An example method of service aware P-CSCF traffic routing comprises: receiving, at a first master P-CSCF in a first pool of a plurality of P-CSCFs, IMS traffic from a first device; determining, by the first master P-CSCF, a traffic type of the IMS traffic from the first device; based on at least the traffic type of the IMS traffic from the first device, selecting, by the first master P-CSCF, a serving P-CSCF from the first pool for the first device; and forwarding, by the serving P-CSCF for the first device, the IMS traffic from the first device to an IMS.

An example system for service aware P-CSCF traffic routing comprises: a processor; and a computer-readable medium storing instructions that are operative upon execution by the processor to: receive, at a first master P-CSCF in a first pool of a plurality of P-CSCFs, IMS traffic from a first device; determine, by the first master P-CSCF, a traffic type of the IMS traffic from the first device: based on at least the traffic type of the IMS traffic from the first device, select, by the first master P-CSCF, a serving P-CSCF from the first pool for the first device; and forward, by the serving P-CSCF for the first device, the IMS traffic from the first device to an IMS.

One or more example computer storage devices has computer-executable instructions stored thereon, which, upon execution by a computer, cause the computer to perform operations comprising: receiving, at a first master P-CSCF in a first pool of a plurality of P-CSCFs, IMS traffic from a first device; determining, by the first master P-CSCF, a traffic type of the IMS traffic from the first device; based on at least the traffic type of the IMS traffic from the first device, selecting, by the first master P-CSCF, a serving P-CSCF from the first pool for the first device; and forwarding, by the serving P-CSCF for the first device, the IMS traffic from the first device to an IMS.

Alternatively, or in addition to the other examples described herein, examples include any combination of the following:

- determining, by the first master P-CSCF, whether the serving P-CSCF for the first device is able to handle traffic for the first device, wherein selecting the serving P-CSCF for the first device comprises: selecting the serving P-CSCF for the first device based on at least the traffic type of the IMS traffic from the first device and based on at least determining that the serving P-CSCF for the first device is able to handle traffic for the first device;
- determining whether a P-CSCF is able to handle traffic for a device includes both determining whether the P-CSCF is properly functioning, and also determining whether the P-CSCF is overloaded;
- determining whether the first master P-CSCF in the first pool of a plurality of P-CSCFs is functioning as a master node for the first pool of a plurality of P-CSCFs;
- based on at least determining that the first master P-CSCF in the first pool of a plurality of P-CSCFs is not functioning as the master node for the first pool of a plurality of P-CSCFs, performing a failover to an alternate master P-CSCF in the first pool of a plurality of P-CSCFs;
- functioning, by the alternate master P-CSCF, as the master node for the first pool of a plurality of P-CSCFs;
- receiving, at a second master P-CSCF in a second pool of a plurality of P-CSCFs, IMS traffic from a second device, wherein the first pool of a plurality of P-CSCFs and the second pool of a plurality of P-CSCFs reside within a common core network;
- determining, by the second master P-CSCF, a traffic type of the IMS traffic from the second device;
- based on at least the traffic type of the IMS traffic from the second device, selecting, by the second master P-CSCF, a serving P-CSCF from the second pool for the second device;
- forwarding, by the serving P-CSCF for the second device, the IMS traffic from the second device to the IMS;
- the traffic type is selected from a list consisting of: 5G cellular, 4G cellular, SMS, WiFi, in-vehicle LAN, RCS, and another cellular generation;
- the first device comprises a cellular UE mobile device or an IoT device;
- the IMS comprises an IMS-AGW; and
- the IMS traffic comprises a SIP invite.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of service aware proxy-call session control function (P-CSCF) traffic routing, the method comprising:
   receiving, at a master P-CSCF, a session initiation protocol (SIP) invite for internet protocol (IP) multimedia subsystem (IMS) traffic from a mobile device that is a fifth generation (5G) capable device;
   determining, by the master P-CSCF, a specific traffic type of the IMS traffic prior to serving P-CSCF assignment, the specific traffic type of the IMS traffic being identified from a list including a 5G cellular traffic type, a Short Messaging Service (SMS) traffic type, a Wi-Fi traffic type, and an in-vehicle local area network (LAN) traffic type;
   based on at least the specific traffic type of the IMS traffic, selecting, by the master P-CSCF, a serving P-CSCF to assign to the mobile device based at least partially on the serving P-CSCF supporting the specific traffic type of the IMS traffic; and
   forwarding, by the master P-CSCF, the SIP invite to the serving P-CSCF.

2. The method of claim 1, wherein the mobile device is a cellular user equipment (UE).

3. The method of claim 1, wherein the mobile device is an internet of things (IoT) device.

4. The method of claim 1, wherein the specific traffic type of the IMS traffic is the 5G cellular traffic type.

5. The method of claim 1, wherein the specific traffic type of the IMS traffic is the SMS traffic type.

6. The method of claim 1, wherein the specific traffic type of the IMS traffic is the Wi-Fi traffic type.

7. The method of claim 1, wherein the specific traffic type of the IMS traffic is the in-vehicle LAN traffic type.

8. A master proxy-call session control function (P-CSCF) comprising:
   a processor; and
   computer-readable medium storing programming instructions that, when executed by the processor, cause the processor to:
   receive a session initiation protocol (SIP) invite for internet protocol (IP) multimedia subsystem (IMS) traffic from a mobile device that is a fifth generation (5G) capable device;
   determine a specific traffic type of the IMS traffic received from the mobile device prior to serving P-CSCF assignment, the specific traffic type of the IMS traffic being identified from a list including a 5G cellular traffic type, a Short Messaging Service (SMS) traffic type, a Wi-Fi traffic type, and an in-vehicle local area network (LAN) traffic type;
   based on at least the specific traffic type of the IMS traffic, select a serving P-CSCF to assign to the mobile device based at least partially on the serving P-CSCF supporting the specific traffic type of the IMS traffic; and
   forward the SIP invite to the serving P-CSCF.

9. The master P-CSCF of claim 8, wherein the mobile device is a cellular user equipment (UE).

10. The master P-CSCF of claim 8, wherein the mobile device is an internet of things (IoT) device.

11. One or more computer storage devices storing programming instructions that, when executed by a processor, cause the processor to:
- receive, at a master P-CSCF, a session initiation protocol (SIP) invite for internet protocol (IP) multimedia subsystem (IMS) traffic from a mobile device that is a fifth generation (5G) capable device;
- determine, by the master P-CSCF, a specific traffic type of the IMS traffic prior to serving P-CSCF assignment, the specific traffic type of the IMS traffic being identified from a list including a 5G cellular traffic type, a Short Messaging Service (SMS) traffic type, a Wi-Fi traffic type, and an in-vehicle local area network (LAN) traffic type;
- based on at least the specific traffic type of the IMS traffic, select, by the master P-CSCF, a serving P-CSCF to assign to the mobile device based at least partially on the serving P-CSCF supporting the specific traffic type of the IMS traffic; and
- forward, by the master P-CSCF, the SIP invite to the serving P-CSCF.

12. The one or more computer storage devices of claim 11, wherein the mobile device is a cellular user equipment (UE).

13. The one or more computer storage devices of claim 11, wherein the mobile device is an internet of things (IoT) device.

* * * * *